United States Patent
Peng

(10) Patent No.: US 12,333,120 B2
(45) Date of Patent: Jun. 17, 2025

(54) METHOD FOR CONTROLLING DISPLAY IN FLOATING WINDOW, ELECTRONIC DEVICE, AND STORAGE MEDIUM

(71) Applicant: Beijing Xiaomi Mobile Software Co., Ltd., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/325,737

(22) Filed: May 30, 2023

(65) Prior Publication Data

US 2024/0220064 A1    Jul. 4, 2024

(30) Foreign Application Priority Data

Dec. 29, 2022   (CN) .......................... 202211713199.3

(51) Int. Cl.
  *G06F 3/048*    (2013.01)
  *G06F 3/0481*   (2022.01)
  *G06F 9/451*    (2018.01)

(52) U.S. Cl.
  CPC ............ *G06F 3/0481* (2013.01); *G06F 9/452* (2018.02)

(58) Field of Classification Search
  CPC ...... G06F 3/0481; G06F 9/452; G06F 3/0482; G06F 3/04817; G06F 40/295; G06F 16/906; G06F 40/166; G06F 16/908; G06Q 10/103; G06Q 10/0633; G06Q 10/101; H04M 1/72563; H04L 67/18
  See application file for complete search history.

(56) References Cited

U.S. PATENT DOCUMENTS

| | | | | | |
|---|---|---|---|---|---|
| 5,786,810 | A | * | 7/1998 | Knox | G06F 3/0213 345/170 |
| 5,920,303 | A | * | 7/1999 | Baker | G06F 3/04886 708/145 |
| 5,969,698 | A | * | 10/1999 | Richard | G06F 1/1637 359/13 |
| 6,121,960 | A | * | 9/2000 | Carroll | G06F 1/1626 345/169 |
| 6,144,378 | A | * | 11/2000 | Lee | G06F 3/0236 715/767 |
| 6,266,048 | B1 | * | 7/2001 | Carau, Sr. | G06F 3/0238 345/158 |

(Continued)

FOREIGN PATENT DOCUMENTS

| | | |
|---|---|---|
| CN | 103051516 A | 4/2013 |
| CN | 104898952 A | 9/2015 |
| WO | 2021213164 A1 | 10/2021 |

*Primary Examiner* — Nicholas Augustine
(74) *Attorney, Agent, or Firm* — McCoy Russell LLP

(57) ABSTRACT

A method for controlling display in a floating window includes: under the condition that the floating window is enabled, monitoring an information update event of monitored applications in real time, where the monitored applications are applications in a running state and are different from a main application that a user is using in the foreground; determining a target monitored application to be displayed this time according to a monitoring result within latest preset time; and displaying latest update information of the target monitored application by displaying an information display page of the target monitored application by the floating window on a running interface of the main application.

13 Claims, 4 Drawing Sheets

---

S101 — Monitor, under the condition that a floating window is enabled, an information update event of each of a plurality of monitored applications in real time S102 — Determine a target monitored application to be displayed this time according to a monitoring result within latest preset time S103 — Display latest update information of the target monitored application by displaying, on a running interface of a main application, an information display page of the target monitored application by means of the floating window

(56) References Cited

U.S. PATENT DOCUMENTS

| | | | | |
|---|---|---|---|---|
| 6,549,219 B2* | 4/2003 | Selker | G06F 3/0482 | 345/902 |
| 6,614,422 B1* | 9/2003 | Rafii | G06F 3/04886 | 345/169 |
| 6,750,849 B2* | 6/2004 | Potkonen | G06F 3/0426 | 345/173 |
| 6,801,190 B1* | 10/2004 | Robinson | G06F 3/0489 | 345/173 |
| 6,977,643 B2* | 12/2005 | Wilbrink | G06F 3/0421 | 715/773 |
| 7,151,530 B2* | 12/2006 | Roeber | G06V 30/1423 | 345/170 |
| 7,478,339 B2* | 1/2009 | Pettiross | G06F 3/0481 | 715/779 |
| 7,992,102 B1* | 8/2011 | De Angelo | G06F 3/04886 | 715/834 |
| 8,645,842 B2* | 2/2014 | Kondziela | H04L 41/22 | 715/751 |
| 8,832,190 B1* | 9/2014 | Leske | H04L 51/04 | 709/204 |
| 9,201,563 B2* | 12/2015 | Jia | G09G 5/14 | |
| 9,477,374 B1* | 10/2016 | Snabl | H04L 67/10 | |
| 9,754,025 B2* | 9/2017 | Roswell | G06F 16/683 | |
| 2002/0075240 A1* | 6/2002 | Lieberman | G06F 3/011 | 345/170 |
| 2004/0233238 A1* | 11/2004 | Lahdesmaki | H04N 21/4622 | 715/810 |
| 2005/0138564 A1* | 6/2005 | Fogg | G06F 16/9038 | 715/848 |
| 2005/0192924 A1* | 9/2005 | Drucker | G06F 3/0483 | |
| 2006/0048076 A1* | 3/2006 | Vronay | G06F 3/0482 | 715/850 |
| 2007/0005477 A1* | 1/2007 | McAtamney | G06Q 40/00 | 705/35 |
| 2007/0033220 A1* | 2/2007 | Drucker | G06F 16/44 | |
| 2007/0180392 A1* | 8/2007 | Russo | G06F 3/04883 | 715/810 |
| 2007/0188494 A1* | 8/2007 | Agutter | G06T 11/206 | 345/440 |
| 2009/0214034 A1* | 8/2009 | Mehrotra | G06Q 10/107 | 380/255 |
| 2010/0229130 A1* | 9/2010 | Edge | G06F 3/04883 | 715/863 |
| 2010/0293475 A1* | 11/2010 | Nottingham | G06Q 10/107 | 715/752 |
| 2011/0047014 A1* | 2/2011 | De Angelo | G06F 3/0482 | 715/810 |
| 2011/0138314 A1* | 6/2011 | Mir | G06F 9/452 | 715/779 |
| 2011/0219324 A1* | 9/2011 | Watanabe | G06F 3/048 | 715/771 |
| 2011/0271230 A1* | 11/2011 | Harris | G06F 3/0482 | 715/810 |
| 2012/0124520 A1* | 5/2012 | Samp | G06F 3/04886 | 715/834 |
| 2012/0324017 A1* | 12/2012 | Bellomo | G06Q 10/10 | 709/205 |
| 2013/0014006 A1* | 1/2013 | Abellera | G06F 3/04817 | 715/744 |
| 2013/0019174 A1* | 1/2013 | Gil | G06F 9/452 | 715/711 |
| 2013/0080909 A1* | 3/2013 | Reeves | G09G 5/14 | 715/740 |
| 2013/0080975 A1* | 3/2013 | Geithner | G06F 3/04817 | 715/828 |
| 2014/0052538 A1* | 2/2014 | Foote | G06Q 30/02 | 709/204 |
| 2015/0033149 A1* | 1/2015 | Kuchoor | H04N 21/4782 | 715/753 |
| 2016/0334943 A1* | 11/2016 | Jeon | G06F 3/0482 | |
| 2017/0149959 A1* | 5/2017 | Shin | H04M 1/72469 | |
| 2017/0205791 A1* | 7/2017 | Yang | D06F 37/04 | |
| 2018/0253538 A1* | 9/2018 | Lin | G06F 21/31 | |
| 2018/0307390 A1* | 10/2018 | Fang | G06F 9/44 | |
| 2018/0329550 A1* | 11/2018 | Dellinger | G06F 3/0412 | |
| 2020/0142552 A1* | 5/2020 | Borkar | H04L 67/02 | |
| 2021/0342785 A1* | 11/2021 | Mann | G06F 40/186 | |
| 2022/0319469 A1* | 10/2022 | Hassan | G09G 5/363 | |
| 2022/0365645 A1* | 11/2022 | Tyler | G06F 3/0486 | |
| 2023/0043742 A1* | 2/2023 | Liu | G06F 3/0481 | |
| 2023/0153133 A1* | 5/2023 | Yue | G06F 9/453 | 715/764 |
| 2023/0376325 A1* | 11/2023 | Mo | G06F 9/451 | |
| 2024/0184989 A1* | 6/2024 | Mann | G06F 40/166 | |

* cited by examiner

METHOD FOR CONTROLLING DISPLAY IN FLOATING WINDOW, ELECTRONIC DEVICE, AND STORAGE MEDIUM

CROSS-REFERENCE TO RELATED APPLICATIONS

The present application claims priority to Chinese Patent Application No. 202211713199.3 filed on Dec. 29, 2022. The entire contents of the above-listed application are hereby incorporated by reference for all purposes.

BACKGROUND

With the rapid development of science and technology, functions of mobile phones, computers and other terminal devices keep increasing. With various applications (APPs) installed in the terminal devices, chat, shopping, payment and booking air tickets or hotels will be achievable.

However, the APPs are independent of each other. Viewing messages from other APPs requires switching the APPs. In general, a user has to manually exit a current APP to return to a main interface of a terminal device, and find and open a corresponding target APP before viewing a corresponding message from the target APP. In this way, messages from multiple APPs cannot be viewed simultaneously, which is unintelligent and influences user experience.

SUMMARY

A first aspect of an example of the disclosure provides a method for controlling display in a floating window. The method is performed by an electronic device and includes:
  under the condition that the floating window is enabled, monitoring an information update event of each of a plurality of monitored applications in real time, where the monitored applications are applications in a running state and are different from a main application that a user is using in the foreground;
  determining a target monitored application to be displayed this time according to a monitoring result within latest preset time; and
  displaying latest update information of the target monitored application by displaying an information display page of the target monitored application by means of the floating window on a running interface of the main application.

A second aspect of an example of the disclosure provides an electronic device. The electronic device includes:
  a processor; and
  a memory configured to store an instruction executable by the processor, where
  the processor is configured to execute steps of the method for controlling display in a floating window according to the first aspect of the disclosure.

A third aspect of an example of the disclosure provides a non-transitory computer-readable storage medium. The computer-readable storage medium stores a computer program instruction, where the computer program instruction implements steps of the method for controlling display in a floating window according to the first aspect of the disclosure when executed by a processor.

It is to be understood that the above general description and the following detailed description are merely illustrative and explanatory, and cannot limit the disclosure.

BRIEF DESCRIPTION OF THE DRAWINGS

The accompanying drawings here are incorporated in the description as a constituent part of the description, illustrate examples conforming to the disclosure, and serve to describe principles of the disclosure together with the description.

DETAILED DESCRIPTION

Examples will be described in detail here and shown in the accompanying drawings illustratively. When the following descriptions involve the accompanying drawings, unless otherwise specified, the same numeral in different accompanying drawings denotes the same or similar elements. The embodiments described in the following examples do not denote all embodiments consistent with the disclosure. On the contrary, the embodiments are merely examples of an apparatus and a method consistent with some aspects of the disclosure as detailed in the appended claims.

The disclosure relates to the technical field of terminals, and particularly relates to a method and apparatus for controlling display in a floating window, an electronic device, and a storage medium.

Figure 1:
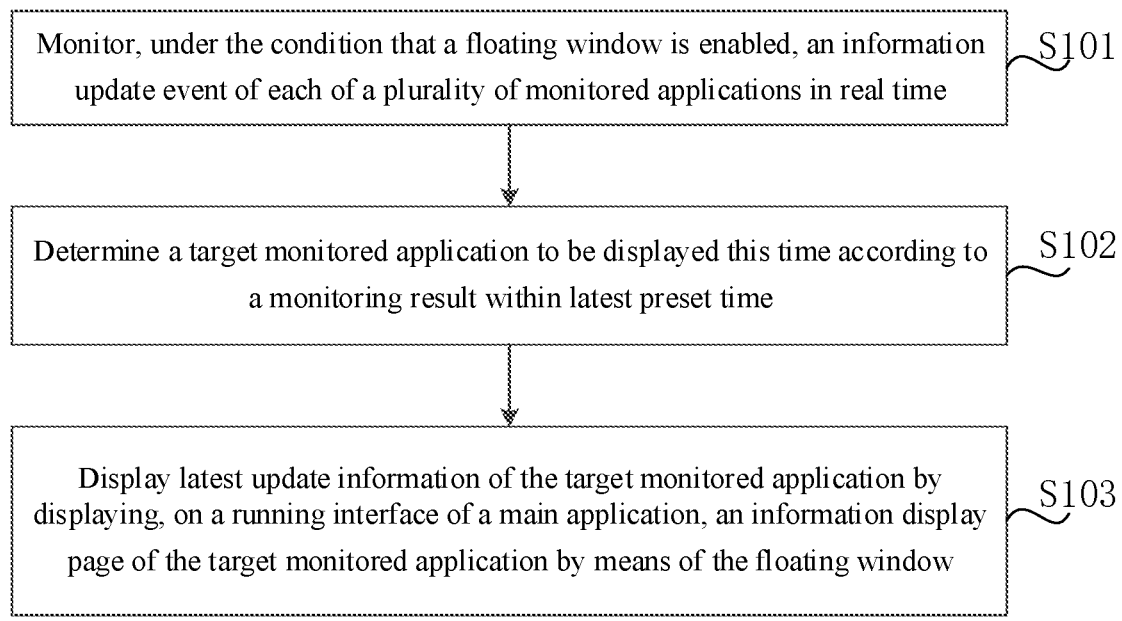
FIG. 1 is a flow diagram of a method for controlling display in a floating window according to an example.

FIG. 1 is a flow diagram of a method for controlling display in a floating window according to an example. The method may be performed by electronic device, such as a smart phone, a smart tablet, a computer, or other electronic devices. As shown in FIG. 1, the method for controlling display in a floating window may include S101-S103.

S101, under the condition that the floating window is enabled, an information update event of each of a plurality of monitored applications is monitored in real time.

The monitored applications are applications in a running state and are different from a main application that a user is using in the foreground.

With the development of technology, increasing electronic devices may support a floating window function. That is, a movable window is floated on a display interface of other applications, through which different applications may be displayed. For most electronic devices, the use of the floating window requires system authorization. After being authorized, the electronic devices may enable the floating window.

A plurality of applications may be installed and run in an electronic device simultaneously. The main application is an application that the user is using in the foreground. In most cases, a display interface of the main application occupies most of a screen area of a display screen of the electronic device. The monitored applications may run in the background and be in a working state, but are different from the main application. The monitored applications are not displayed on the screen in real time under the condition that the floating window is not enabled, while the main application is displayed on the screen in real time. Whether the application is being used in the foreground or running in the background, the application may quickly respond to a relevant instruction issued by the user.

Each user has different usage habits and preferences, and each application has different usage frequencies, so monitored applications in different electronic devices are different accordingly. For example, the monitored applications may be set by the user, or may be determined according to usage frequencies of the applications, or may be determined according to switching time when the applications are switched to the background for running.

The information update events may include events of receiving a new message notification and refreshing an information display page. In this way, monitoring of all the applications in the electronic device may be avoided, and energy consumption of the electronic device may be reduced. Under the condition that the floating window is enabled, the information update event of each of the plurality of monitored applications is monitored in real time, such that continuous monitoring may be achieved to ensure real-time monitoring results, and further real-time contents to be displayed in the floating window may be ensured.

S102, a target monitored application to be displayed this time is determined according to a monitoring result within latest preset time.

For example, the preset time may be set according to an accuracy requirement of the monitoring result or an actual requirement, and may be set as 5s for example. The monitoring result may include the information update event of each monitored application monitored within the latest preset time. For example, the monitored applications include application A, application B, and application C, the target monitored application to be displayed this time in the floating window may be determined according to respective information update events of the application A, the application B and the application C within latest 5s. The target monitored application to be displayed this time may be the same as a monitored application currently displayed in the floating window or not.

S103, latest update information of the target monitored application is displayed by displaying an information display page of the target monitored application by means of the floating window on a running interface of the main application.

For example, after the target monitored application to be displayed this time is determined, the information display page of the target monitored application may be displayed by means of the floating window, and the latest update information of the target monitored application may be displayed on the information display page of the target monitored application. The update information may include a notification message and page refresh data. For example, the target monitored application is chat software and latest update information of the chat software is a chat message send from contact p, an information display page of the chat software may be displayed by means of the floating window, and a content displayed on the information display page may be the chat message send from the contact p.

In the technical solution of the disclosure, under the condition that the floating window is enabled, the information update event of each of the plurality of monitored applications may be monitored in real time, the target monitored application to be displayed this time may be determined according to the monitoring result, and the information display page of the target monitored application may be displayed by means of the floating window. In this way, the user does not need to manually switch an application, and may quickly view the latest update information of the target monitored application through contents displayed in the floating window, such that intelligence of the electronic device is improved, and further user experience is enhanced.

In an example, the plurality of monitored applications may include at least one of the following:

applications that the user expects to monitor in applications that are in the running state and are different from the main application;

a first preset number of applications used most frequently by the user in applications that are in the running state and are different from the main application;

a second preset number of applications switched to the background for running at switching time closest to current time in applications that are in the running state and are different from the main application; or a third preset number of applications having a maximum switching frequency between foreground running and background running or applications having a switching frequency between foreground running and background running greater than a preset switching frequency threshold in applications that are in the running state and are different from the main application.

For example, the applications that the user expects to monitor may be preset by the user. The applications that the user expects to monitor in the applications that are in the running state and are different from the main application are determined as the monitored applications. In this way, a monitoring intention of the user may be fully reflected, and the applications that the user expects to monitor may be monitored.

In an example, the first preset number may be preset, and may be set as 3 for example. A usage frequency of the user may reflect a preference of the user, that is, attention of the user to different applications. The greater the usage frequency, and the higher the attention of the user to the application. The first preset number of applications used most frequently by the user in the applications that are in the running state and are different from the main application are determined as the monitored applications. In this way, applications attracting more attention from the user may be monitored.

In an example, the second preset number may be preset, and may be set as 2 for example. Opening and using one application by a user may indicate that the application attracts more attention from the user at least within a short time. The closer the application is switched to the background for running at switching time to current time, the greater a possibility of reusing the application by the user, and the greater a possibility of paying attention to the application. In this way, the second preset number of applications switched to the background for running at switching time closest to current time in the applications that are in the running state and are different from the main application are determined as the monitored applications, such that applications attracting more attention from the user may be monitored.

In an example, the third preset number may be preset, and may be set as 4 for example. The switching frequency threshold may be preset, and may be set as 5 for example. When an application has a high switching frequency between foreground running and background running, the application may be determined as an application used frequently by the user and attracting more attention from the user. The third preset number of applications having the maximum switching frequency between foreground running and background running or the applications having the switching frequency between foreground running and background running greater than the preset switching frequency threshold in the applications that are in the running state and are different from the main application are determined as the monitored applications. In this way, applications used frequently by the user and attracting more attention from the user may be monitored.

In an embodiment, S102 may further include:
under the condition that a monitored application is currently displayed in the floating window,
in response to determining that the monitoring result shows that an information update event corresponding to a first monitored application currently displayed in the floating window is monitored, the first monitored application is continuously regarded as the target monitored application to be displayed this time; and alternatively,
in response to determining that the monitoring result shows that an information update event corresponding to a second monitored application not currently displayed in the floating window is monitored, the second monitored application is determined as the target monitored application to be displayed this time.

Figure 2A:
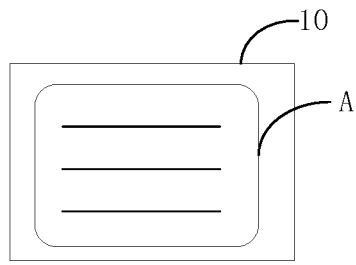
FIGS. 2(*a*) and 2(*b*) are schematic diagrams of a floating window in a display state according to an example.

As shown in FIG. 2(a), a content currently displayed in the floating window 10 is an information display page of the application A. Transverse lines on the information display page may be configured to represent latest update information of the application A currently displayed. The application A is the first monitored application.

When the information update event of the application A is monitored within the latest preset time, the application A currently displayed in the floating window 10 may be continuously regarded as the target monitored application to be displayed this time. That is, the information display page to be displayed this time in the floating window 10 is still the information display page of the application A. However, a content of the update information represented by the transverse lines may be updated according to the information update event of the application A monitored in the latest preset time. The monitored application currently displayed in the floating window is generally an application used frequently by the user, or an application in which more information is updated within a short time, or an application having a great information activity level. In response to determining that the information update event corresponding to the monitored application currently displayed in the floating window is monitored within the latest preset time, the monitored application currently displayed in the floating window is continuously regarded as the target monitored application to be displayed this time. In this way, the application displayed in the floating window may be prevented from being switched too frequently while a real-time content to be displayed in the floating window may be ensured, and further energy consumption of the electronic device may be reduced.

For example, the content currently displayed in the floating window is as shown in FIG. 2(a), and the monitored applications include the application A and the application B. The application A is the first monitored application, and the application B is the second monitored application. In response to determining that the information update event corresponding to the application B is monitored, the application B may be determined as the target monitored application to be displayed this time.

In response to determining that a monitoring result shows that no information update event corresponding to the monitored application currently displayed in the floating window (i.e., the first monitored application) is monitored and the information update event corresponding to the monitored application not currently displayed in the floating window (i.e., the second monitored application) is monitored, a monitored application (i.e., the second monitored application) corresponding to an information update event latest monitored in the monitoring result may be determined as the target monitored application to be displayed this time.

Figure 2B:
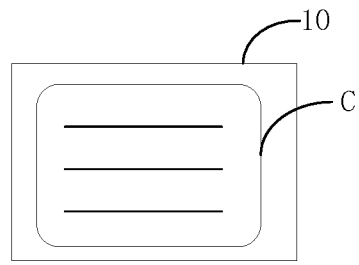

For example, the content currently displayed in the floating window is as shown in FIG. 2(a), and the monitored applications include the application A, the application B, and the application C. The application A is the first monitored application, and the application B and the application C are the second monitored applications. In response to determining that no information update event of the application A is monitored within the latest preset time and the application corresponding to the information update event latest monitored in the monitoring result is the application C, the application C may be determined as the target monitored application to be displayed this time. The content displayed in the floating window may be switched from FIG. 2(a) to FIG. 2(b). As shown in FIG. 2(b), after switching, the floating window 10 may display an information display page of the application C. Transverse lines in FIG. 2(b) may be configured to represent latest update information of the application C. In this way, timeliness of the target monitored application displayed in the floating window may be improved, and the user may view the latest update information of each monitored application in time.

In another embodiment, S102 may further include:
under the condition that no monitored application is currently displayed in the floating window, the monitored application corresponding to the information update event latest monitored in the monitoring result is determined as the target monitored application.

Figure 3A:
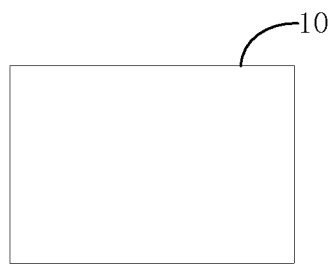
FIGS. 3(*a*) and 3(*b*) are schematic diagrams of a floating window in a display state according to an example.
Figure 3B:
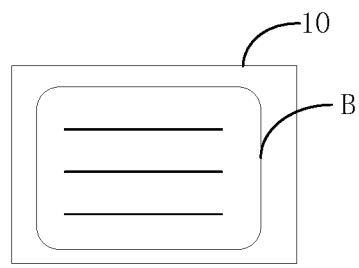

For example, a schematic diagram of the floating window with no monitored application currently displayed may be as shown in FIG. 3(a). For example, when the user just enables a floating window function, the floating window may display no monitored application currently. Still with the monitored applications including the application A, the application B and the application C as an example, in response to determining that the application corresponding to the information update event latest monitored in the monitoring result is the application B, the application B may be determined as the target monitored application. The content displayed in the floating window may be switched from FIG. 3(a) to FIG. 3(b). As shown in FIG. 3(b), after switching, the floating window 10 may display an information display page of the application B. Transverse lines in FIG. 3(b) may be configured to represent latest update information of the application B. In this way, timeliness of the target monitored application displayed in the floating window may be improved, the user may view the latest update information of each monitored application in time, and user experience may be improved.

In another embodiment, S102 may further include:
an information activity level of each monitored application is determined according to the monitoring result, where the information activity level is configured to represent an information update rate of the monitored application; and
the target monitored application to be displayed this time is determined according to the information activity level.

For example, the information activity level may be determined according to the amount of update information within preset time, that is, according to the information update rate. The greater the amount of update information within the preset time, the higher the information update rate, and the greater the information activity level. The smaller the amount of update information within the preset time, the lower the information update rate, and the smaller the information activity level. In this way, the target monitored application to be displayed this time is determined according to the information activity level, such that a monitored application that has a small information activity level but occasionally receives latest update information may be prevented from being displayed, and accuracy of the content displayed in the floating window may be improved.

In an alternative example, the step that the target monitored application to be displayed this time is determined according to the information activity level may include:
    under the condition that no monitored application is currently displayed in the floating window, a monitored application corresponding to a maximum information activity level may be determined as the target monitored application to be displayed this time.

For example, a schematic diagram of the floating window with no monitored application currently displayed may be as shown in FIG. 3(a). Still with the monitored applications including the application A, the application B and the application C as an example, in response to determining that the application B has the maximum information activity level within the latest preset time, for example, the amount of update information of the application B within latest 5s is greater than the amount of update information of the application A within latest 5s and the amount of update information of the application C within latest 5s, the application B may be determined as the target monitored application to be displayed this time. The content displayed in the floating window may be switched from FIG. 3(a) to FIG. 3(b). As shown in FIG. 3(b), after switching, the floating window 10 may display the information display page of the application B. The transverse lines in FIG. 3(b) may be configured to represent the latest update information of the application B. In this way, the user may view the latest update information of the application having the maximum information activity level in time, and user experience may be improved.

In another alternative example, the step that the target monitored application to be displayed this time is determined according to the information activity level may include:
    under the condition that a plurality of monitored applications are currently displayed in the floating window, a monitored application having an information activity level not smaller than a preset information activity level threshold in the monitored applications currently displayed in the floating window is determined as the target monitored application to be displayed this time.

The method for controlling display in a floating window according to the disclosure may further include the following step that under the condition that the plurality of monitored applications are currently displayed in the floating window, display of a monitored application having an information activity level smaller than the information activity level threshold in the monitored applications currently displayed in the floating window is exited.

Figure 4A:
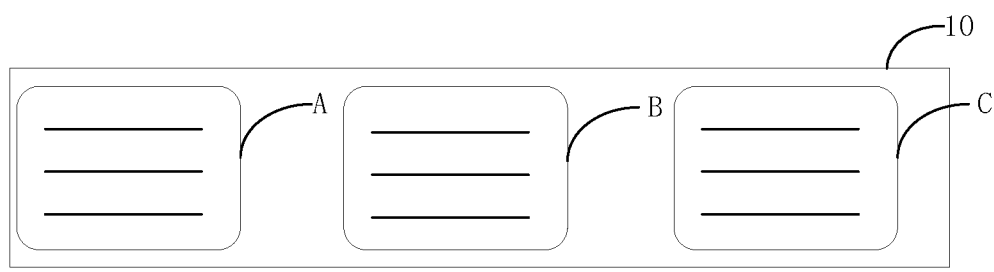
FIGS. 4(*a*) and 4(*b*) are schematic diagrams of a floating window in a display state according to an example.
Figure 4B:
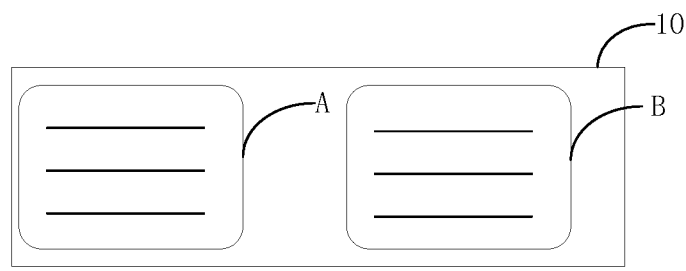

For example, the information activity level threshold may be preset, and may be set as 5 for example. As shown in FIG. 4(a), the floating window 10 simultaneously displays the respective information display pages of the application A, the application B and the application C. For example, an information activity level of the application A is 6, an information activity level of the application B is 8, and an information activity level of the application C is 3, it may be determined that the information activity levels of the application A and the application B are not smaller than the preset information activity level threshold and the information activity level of the application C is smaller than the preset information activity level threshold, and the application A and the application B may be continuously regarded as the target monitored applications to be displayed this time while display of the application C is exited, that is, the application C is not continuously regarded as the target monitored application to be displayed this time. The content displayed in the floating window may be switched from FIG. 4(a) to FIG. 4(b). As shown in FIG. 4(b), after switching, the floating window 10 may simultaneously display the information display pages of the application A and the application B. The transverse lines may be configured to represent the latest update information of the corresponding application. In this way, the floating window may not display the monitored application having a small information activity level this time, and further energy consumption of the electronic device may be reduced.

In another alternative example, the step that the target monitored application to be displayed this time is determined according to the information activity level may include:
    under the condition that a plurality of monitored applications are currently displayed in the floating window, in response to determining that the information activity level of each monitored application currently displayed in the floating window is smaller than the preset information activity level threshold and monitored applications not currently displayed in the floating window are present, the target monitored application to be displayed this time is determined from the monitored applications not currently displayed in the floating window.

In response to determining that the information activity level of each monitored application currently displayed in the floating window is smaller than the preset information activity level threshold, it may be determined that the monitored applications currently displayed have small information activity levels and a small amount of update information. In response to determining that monitored applications not currently displayed in the floating window are present, the target monitored application to be displayed this time may be determined from the monitored applications not currently displayed. For example, the monitored applications include the application A, the application B, the application C, application D, and application E. The floating window 10 simultaneously displays the respective information display pages of the application A, the application B and the application C as shown in FIG. 4(a). In response to determining that the information activity level of each of the application A, the application B and the application C is smaller than the preset information activity level threshold, the target monitored application to be displayed this time may be determined from the application D and the application E. In this way, an information display page of a new application may be displayed in the floating window, such that a displayed content is prevented from being displayed repeatedly, and user experience is improved.

The step that the target monitored application to be displayed this time is determined from the monitored applications not currently displayed in the floating window may include:

a monitored application having a maximum information activity level in the monitored applications not currently displayed in the floating window is determined as the target monitored application to be displayed this time; and alternatively, in a preset display order, a monitored application ranking first in the display order in the monitored applications not currently displayed in the floating window is determined as the target monitored application to be displayed this time.

Figure 5A:
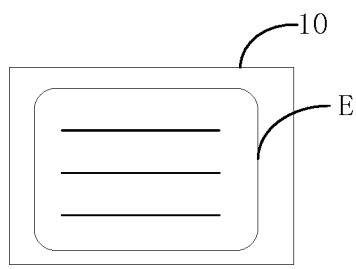
FIGS. 5(*a*) and 5(*b*) are schematic diagrams of a floating window in a display state according to an example.

As mentioned above, for example, contents currently displayed in the floating window are as shown in FIG. 4(a), the information activity levels of the application A, the application B and the application C are all smaller than the preset information activity level threshold, and the monitored applications not currently displayed in the floating window are the application D and the application E, the one with the maximum information activity level in the application D and the application E may be determined as the target monitored application to be displayed this time. For example, in response to determining that the application E has the maximum information activity level, the application E may be determined as the target monitored application to be displayed this time. The content displayed in the floating window may be switched from FIG. 4(a) to FIG. 5(a). As shown in FIG. 5(a), after switching, the floating window 10 may display the information display page of the application E. Transverse lines may be configured to represent latest update information of the application E. In this way, the user may view latest update information of an application having the maximum information activity level in other monitored applications except an application previously displayed in the floating window in time, such that user experience may be improved.

Figure 5B:
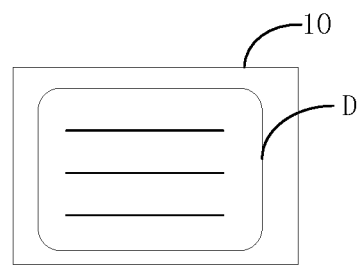

Alternatively, for example, the monitored applications not currently displayed in the floating window are the application D and the application E, the monitored application ranking first in a preset display order of the application D and the application E may be determined as the target monitored application to be displayed this time in the preset display order corresponding to the application D and the application E. For example, assuming that the application D is prior to the application E in the display order, the application D may be determined as the target monitored application to be displayed this time. The content displayed in the floating window may be switched from FIG. 4(a) to FIG. 5(b). As shown in FIG. 5(b), after switching, the floating window 10 may display the information display page of the application D. Transverse lines may be configured to represent latest update information of the application D. In this way, an information display page of a new application may be displayed in the floating window, such that a displayed content is prevented from being displayed repeatedly, and user experience is improved.

The preset display order may be preset, or may be determined according to usage frequencies of the applications, where the greater the usage frequency, the prior in the display order, or may be determined according to switching time when the applications are switched to the background for running, where the closer the switching time is to current time, the prior in the display order.

In another alternative example, the step that the target monitored application to be displayed this time is determined according to the information activity level may include:

in response to determining that the information activity level of each monitored application currently displayed in the floating window is smaller than the information activity level threshold and no monitored applications not currently displayed in the floating window are present, in a preset display order, a monitored application ranking first in the display order in the monitored applications currently displayed in the floating window is determined as the target monitored application to be displayed this time.

The method for controlling display in a floating window according to the disclosure may further include the following step that display of monitored applications not ranking first in the display order in the monitored applications currently displayed in the floating window is exited.

For example, in response to determining that the information activity level of each monitored application currently displayed in the floating window is smaller than the information activity level threshold and no monitored applications not currently displayed in the floating window are present, it may be determined that all the current monitored applications have small information activity levels, and the target monitored application to be displayed this time may be determined in the preset display order. For example, the contents currently displayed in the floating window are as shown in FIG. 4(a), the information activity levels of the application A, the application B and the application C are all smaller than the preset information activity level threshold, no monitored applications not currently displayed in the floating window are present, and the preset display order of the application A, the application B and the application C is the application B, the application A, and the application C, the application B may be determined as the target monitored application to be displayed this time, and display of the application A and the application C is exited. That is, the application A and the application C are not continuously regarded as the target monitored applications to be displayed this time. The content displayed in the floating window may be switched from FIG. 4(a) to FIG. 3(b). As shown in FIG. 3(b), after switching, the floating window 10 may display the information display page of the application B. The transverse lines may be configured to represent the latest update information of the application B. In this way, the application having the small information activity level may be displayed, such that omission of a notification message is avoided, and further, energy consumption of the electronic device may be reduced by reducing the number of monitored applications displayed in the floating window.

In another alternative example, the step that the target monitored application to be displayed this time is determined according to the information activity level may include:

under the condition that one monitored application is currently displayed in the floating window, a monitored application corresponding to a maximum information activity level in information activity levels not smaller than a preset information activity level threshold in the monitored applications monitored is determined as the target monitored application to be displayed this time.

For example, the content currently displayed in the floating window is as shown in FIG. 2(a). The application A is the monitored application currently displayed in the floating window. The monitored applications monitored include the application A and the application B. In response to determining that the information activity levels of the application A and the application B are both greater than the information activity level threshold, the one with the maximum information activity level in the application A and the application B may be determined as the target monitored application to be displayed this time. In response to determining that the information activity level of the application A is greater than the information activity level of the application B, the application A may be continuously regarded as the target monitored application to be displayed this time. That is, the information display page to be displayed this time in the floating window 10 is still the information display page of the application A. However, a content of the update information represented by the transverse lines may be updated according to the information update event of the application A monitored in the latest preset time. In response to determining that the information activity level of the application A is smaller than the information activity level of the application B, the application B may be determined as the target monitored application to be displayed this time. The content displayed in the floating window may be switched from FIG. 2(a) to FIG. 3(b). As shown in FIG. 3(b), after switching, the floating window 10 may display the information display page of the application B. In this way, the user may view the latest update information of the application having the maximum information activity level in the monitored applications monitored in time, and further user experience may be improved.

In another alternative example, the step that the target monitored application to be displayed this time is determined according to the information activity level may include:

under the condition that one monitored application is currently displayed in the floating window, in response to determining that the information activity level of each monitored application monitored is smaller than a preset information activity level threshold, in a preset display order, a successive monitored application ranking behind the monitored application currently displayed in the floating window is determined as the target monitored application to be displayed this time.

For example, the content currently displayed in the floating window is as shown in FIG. 2(a). The application A is the monitored application currently displayed in the floating window. The monitored applications monitored include the application A, the application B, and the application C. In response to determining that the information activity levels of the application A, the application B and the application C are all smaller than the information activity level threshold, the target monitored application to be displayed this time may be determined in the preset display order of the application A, the application B and the application C. For example, the preset display order is the application A, the application B and the application C and the application B is the successive monitored application ranking behind the application A currently displayed in the floating window, the application B may be determined as the target monitored application to be displayed this time. The content displayed in the floating window may be switched from FIG. 2(a) to FIG. 3(b). As shown in FIG. 3(b), after switching, the floating window 10 may display the information display page of the application B. In this way, the application having the small information activity level may be displayed, such that omission of a notification message is avoided; and an information display page of a new application may be displayed in the floating window, such that a displayed content is prevented from being displayed repeatedly, and user experience is improved.

As a possible embodiment, the step that the target monitored application to be displayed this time is determined according to the information activity level may include:

under the condition that one monitored application is currently displayed in the floating window, a candidate monitored application to be displayed this time is determined according to the information activity level; and under the condition that the candidate monitored application is inconsistent with the monitored application currently displayed in the floating window, in response to determining that both an information activity level of the candidate monitored application and an information activity level of the monitored application currently displayed in the floating window are greater than a preset information activity level threshold and a continuity count of switching display, in the floating window, of the candidate monitored application and the monitored application currently displayed in the floating window reaches a preset count threshold, both the monitored application currently displayed in the floating window and the candidate monitored application are determined as the target monitored applications to be displayed this time.

For example, the method of determining the candidate monitored application to be displayed this time according to the information activity level is similar to the above-mentioned method of determining the target monitored application to be displayed this time according to the information activity level, which will not be repeated here. In response to determining that the candidate monitored application is consistent with the monitored application currently displayed in the floating window, the candidate monitored application may be determined as the target monitored application to be displayed this time. In response to determining that the candidate monitored application is inconsistent with the monitored application currently displayed in the floating window, the target monitored application to be displayed this time is determined according to the information activity levels of the candidate monitored application and the monitored application currently displayed in the floating window and the continuity count of switching display, in the floating window, of the candidate monitored application and the monitored application currently displayed in the floating window.

For example, assuming that the content currently displayed in the floating window is as shown in FIG. 2(a), the application A is the monitored application currently displayed in the floating window, and the candidate monitored application determined is the application B, the target monitored application to be displayed this time may be determined from the application A and the application B. A count threshold may be preset, and may be set as 3 for example.

In response to determining that the information activity level of any of the application A and the application B is smaller than the preset information activity level threshold, and alternatively, the continuity count of switching display of the application A and the application B in the floating window does not reach the count threshold, the application B may be determined as the target monitored application to be displayed this time. The content displayed in the floating window may be switched from FIG. 2(a) to FIG. 3(b). As shown in FIG. 3(b), after switching, the floating window 10 may display the information display page of the application B.

In response to determining that the information activity levels of the application A and the application B are both greater than the preset information activity level threshold and the continuity count of switching display of the application A and the application B in the floating window reaches the count threshold, both the application A and the application B may be determined as applications attracting more attention from the user and used frequently by the user, and further both the application A and the application B may be finally determined as the target monitored applications to be displayed this time. The content displayed in the floating window may be switched from FIG. 2(a) to FIG. 4(b). As shown in FIG. 4(b), after switching, the floating window 10 may simultaneously display the information display pages of the application A and the application B. The transverse lines may be configured to represent the latest update information of the corresponding application. In this way, the applications finally currently displayed in the floating window may better satisfy user requirements, the user may view the latest update information of the application having high attention and a great information activity level in time, and user experience may be improved.

In an embodiment, S103 may further include:
in response to determining that a plurality of target monitored applications are to be displayed this time and a current window size of the floating window is a default window size, a window size of the floating window is expanded, and respective information display pages of the plurality of target monitored applications to be displayed this time are simultaneously displayed in the expanded floating window.

For example, the default window size may be preset. In order to minimize obstruction to the main application, the default window size may be set as a size suitable for one application. In response to determining that a plurality of target monitored applications are to be displayed this time, it may be determined that the default window size can hardly achieve simultaneous display of the respective information display pages of the plurality of target monitored applications if the floating window is not expanded. The floating window may be expanded according to the number of target monitored applications. For example, in response to determining that the number of target monitored applications to be displayed this time is 2, a size of the floating window may be doubled on the basis of the default window size.

As another possible embodiment, in response to determining that one target monitored application is to be displayed this time and a current window size of the floating window is an expanded window size, a window size of the floating window is restored to a default window size, and the information display page of the target monitored application is displayed in the restored floating window.

For example, the current window size of the floating window is the expanded window size, and the respective information display pages of the plurality of target monitored applications may be displayed simultaneously. Under the condition that one target monitored application is to be displayed this time, the window size of the floating window may be restored to the default window size. In this way, the obstruction to the main application may be reduced as much as possible while the content displayed in the floating window may be ensured to be complete.

In this way, the window size of the floating window may be suitable for the number of the target monitored applications to be displayed by adjusting the window size of the floating window. On the one hand, the content displayed in the floating window may be ensured to be complete, and on the other hand, the obstruction to the main application may be reduced as much as possible, and further user experience may be improved.

In an example, the method for controlling display in a floating window according to the disclosure may further include:
in response to detecting that the user is conducting an input operation on the floating window, whether the user completes the input operation on the floating window is determined; and
in response to determining that the user completes the input operation on the floating window, the step of displaying an information display page of the target monitored application by means of the floating window is executed.

For example, in response to detecting that the user is conducting the input operation on the floating window, it may be determined that the user is using the information display page of the monitored application currently displayed in the floating window. For example, the user is inputting text information into the information display page of the floating window by means of a virtual keyboard, and alternatively, the user is viewing the content by sliding the information display page in the floating window. In response to determining that the user does not complete the input operation on the floating window, it may be determined that the user still pays attention to the information display page of the monitored application currently displayed in the floating window. In order to avoid influence on use, in this case, the application displayed in the floating window may not be switched until the user completes the input operation and starts to switch the application in the floating window. In this way, decrease in user experience may be avoided.

Figure 6:
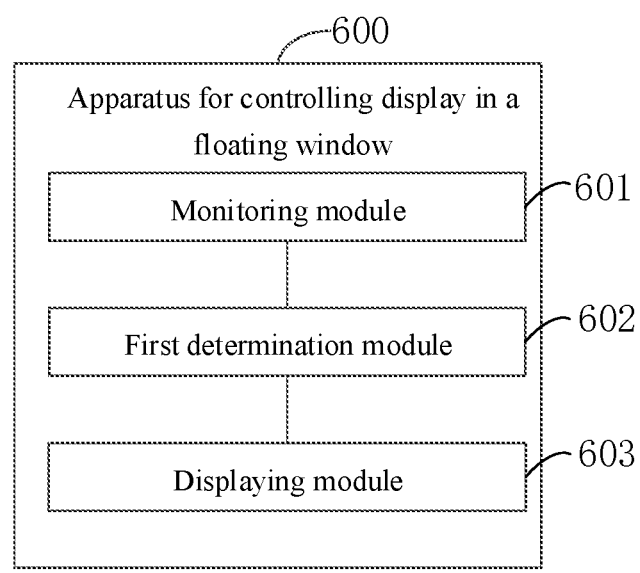
FIG. 6 is a block diagram of an apparatus for controlling display in a floating window according to an example.

Based on the same inventive concept, the disclosure further provides an apparatus for controlling display in a floating window. FIG. 6 is a block diagram of an apparatus 600 for controlling display in a floating window according to an example. With reference to FIG. 6, the apparatus 600 for controlling display in a floating window may include:
a monitoring module 601 configured to monitor, under the condition that the floating window is enabled, an information update event of each of a plurality of monitored applications in real time, where the monitored applications are applications in a running state and are different from a main application that a user is using in the foreground;
a first determination module 602 configured to determine a target monitored application to be displayed this time according to a monitoring result within latest preset time; and
a displaying module 603 configured to display latest update information of the target monitored application by displaying an information display page of the target monitored application by means of the floating window on a running interface of the main application.

In the technical solution of the disclosure, under the condition that the floating window is enabled, the information update event of each of the plurality of monitored applications may be monitored in real time, the target monitored application to be displayed this time may be determined according to the monitoring result, and the information display page of the target monitored application may be displayed by means of the floating window. In this way, the user does not need to manually switch an application, and may quickly view the latest update information of the target monitored application through contents displayed in the floating window, such that intelligence of the electronic device is improved, and further user experience is enhanced.

In an example, the first determination module 602 includes:
- a first determination submodule configured to continuously regard, under the condition that a monitored application is currently displayed in the floating window, in response to determining that the monitoring result shows that an information update event corresponding to a first monitored application currently displayed in the floating window is monitored, the first monitored application as the target monitored application to be displayed this time; and
- a second determination submodule configured to determine, under the condition that a monitored application is currently displayed in the floating window, in response to determining that the monitoring result shows that an information update event corresponding to a second monitored application not currently displayed in the floating window is monitored, the second monitored application as the target monitored application to be displayed this time.

In an example, the first determination module 602 includes: a third determination submodule configured to determine, under the condition that no monitored application is currently displayed in the floating window, a monitored application corresponding to an information update event latest monitored in the monitoring result as the target monitored application.

In an example, the first determination module 602 includes:
- a fourth determination submodule configured to determine an information activity level of each monitored application according to the monitoring result, where the information activity level is configured to represent an information update rate of the monitored application; and
- a fifth determination submodule configured to determine the target monitored application to be displayed this time according to the information activity level.

In an example, the fifth determination submodule includes:
- a sixth determination submodule configured to determine, under the condition that no monitored application is currently displayed in the floating window, a monitored application corresponding to a maximum information activity level as the target monitored application to be displayed this time.

In an example, the fifth determination submodule includes:
- a seventh determination submodule configured to determine, under the condition that a plurality of monitored applications are currently displayed in the floating window, a monitored application having an information activity level not smaller than a preset information activity level threshold in the monitored applications currently displayed in the floating window as the target monitored application to be displayed this time.

The seventh determination submodule is further configured to exit, under the condition that the plurality of monitored applications are currently displayed in the floating window, display of a monitored application having an information activity level smaller than the information activity level threshold in the monitored applications currently displayed in the floating window.

In an example, the fifth determination submodule includes:
- an eighth determination submodule configured to determine, under the condition that a plurality of monitored applications are currently displayed in the floating window, in response to determining that the information activity level of each monitored application currently displayed in the floating window is smaller than a preset information activity level threshold and monitored applications not currently displayed in the floating window are present, the target monitored application to be displayed this time from the monitored applications not currently displayed in the floating window.

In an example, the eighth determination submodule may be configured to determine the target monitored application to be displayed this time from the monitored applications not currently displayed in the floating window by:
- determining a monitored application having a maximum information activity level in the monitored applications not currently displayed in the floating window as the target monitored application to be displayed this time; and alternatively,
- determining, in a preset display order, a monitored application ranking first in the display order in the monitored applications not currently displayed in the floating window as the target monitored application to be displayed this time.

In an example, the fifth determination submodule includes:
- a ninth determination submodule configured to determine, in response to determining that the information activity level of each monitored application currently displayed in the floating window is smaller than the information activity level threshold and no monitored applications not currently displayed in the floating window are present, in a preset display order, a monitored application ranking first in the display order in the monitored applications currently displayed in the floating window as the target monitored application to be displayed this time.

The ninth determination submodule is further configured to exit display of monitored applications not ranking first in the display order in the monitored applications currently displayed in the floating window.

In an example, the fifth determination submodule includes:
- a tenth determination submodule configured to determine, under the condition that one monitored application is currently displayed in the floating window, a monitored application corresponding to a maximum information activity level in information activity levels not smaller than a preset information activity level threshold in the monitored applications monitored as the target monitored application to be displayed this time.

In an example, the fifth determination submodule includes:
- an eleventh determination submodule configured to determine, under the condition that one monitored application is currently displayed in the floating window, in response to determining that the information activity level of each monitored application monitored is smaller than a preset information activity level threshold, in a preset display order, a successive monitored application ranking behind the monitored application currently displayed in the floating window as the target monitored application to be displayed this time.

In an example, the apparatus 600 further includes:
- a second determination module configured to determine, in response to determining that one monitored application is currently displayed in the floating window, a candidate monitored application to be displayed this time according to the information activity level; and a third determination module configured to determine, under the condition that the candidate monitored application is inconsistent with the monitored application currently displayed in the floating window, in response to determining that both an information activity level of the candidate monitored application and an information activity level of the monitored application currently displayed in the floating window are greater than a preset information activity level threshold and a continuity count of switching display, in the floating window, of the candidate monitored application and the monitored application currently displayed in the floating window reaches a preset count threshold, both the monitored application currently displayed in the floating window and the candidate monitored application as the target monitored applications to be displayed this time.

In an example, the displaying module 603 includes:

a first window adjustment module configured to expand, in response to determining that a plurality of target monitored applications are to be displayed this time and a current window size of the floating window is a default window size, a window size of the floating window, and simultaneously display respective information display pages of the plurality of target monitored applications to be displayed this time in the expanded floating window.

In an example, the displaying module 603 includes:

a second window adjustment module configured to restore, in response to determining that one target monitored application is to be displayed this time and a current window size of the floating window is an expanded window size, a window size of the floating window to a default window size, and display the information display page of the target monitored application in the restored floating window.

In an example, the apparatus 600 further includes:

a detection module configured to determine, in response to detecting that the user is conducting an input operation on the floating window, whether the user completes the input operation on the floating window.

The displaying module 603 is configured to execute, in response to determining that the user completes the input operation on the floating window, the operation of displaying an information display page of the target monitored application by means of the floating window.

In an example, the plurality of monitored applications monitored include at least one of the following:

applications that the user expects to monitor in applications that are in the running state and are different from the main application;

a first preset number of applications used most frequently by the user in applications that are in the running state and are different from the main application;

a second preset number of applications switched to the background for running at switching time closest to current time in applications that are in the running state and are different from the main application; or a third preset number of applications having a maximum switching frequency between foreground running and background running or applications having a switching frequency between foreground running and background running greater than a preset switching frequency threshold in applications that are in the running state and are different from the main application.

For the apparatus in the examples described above, a specific method for each module to execute an operation is described in detail in the examples relating to the method, and will not be described in detail here.

Figure 7:
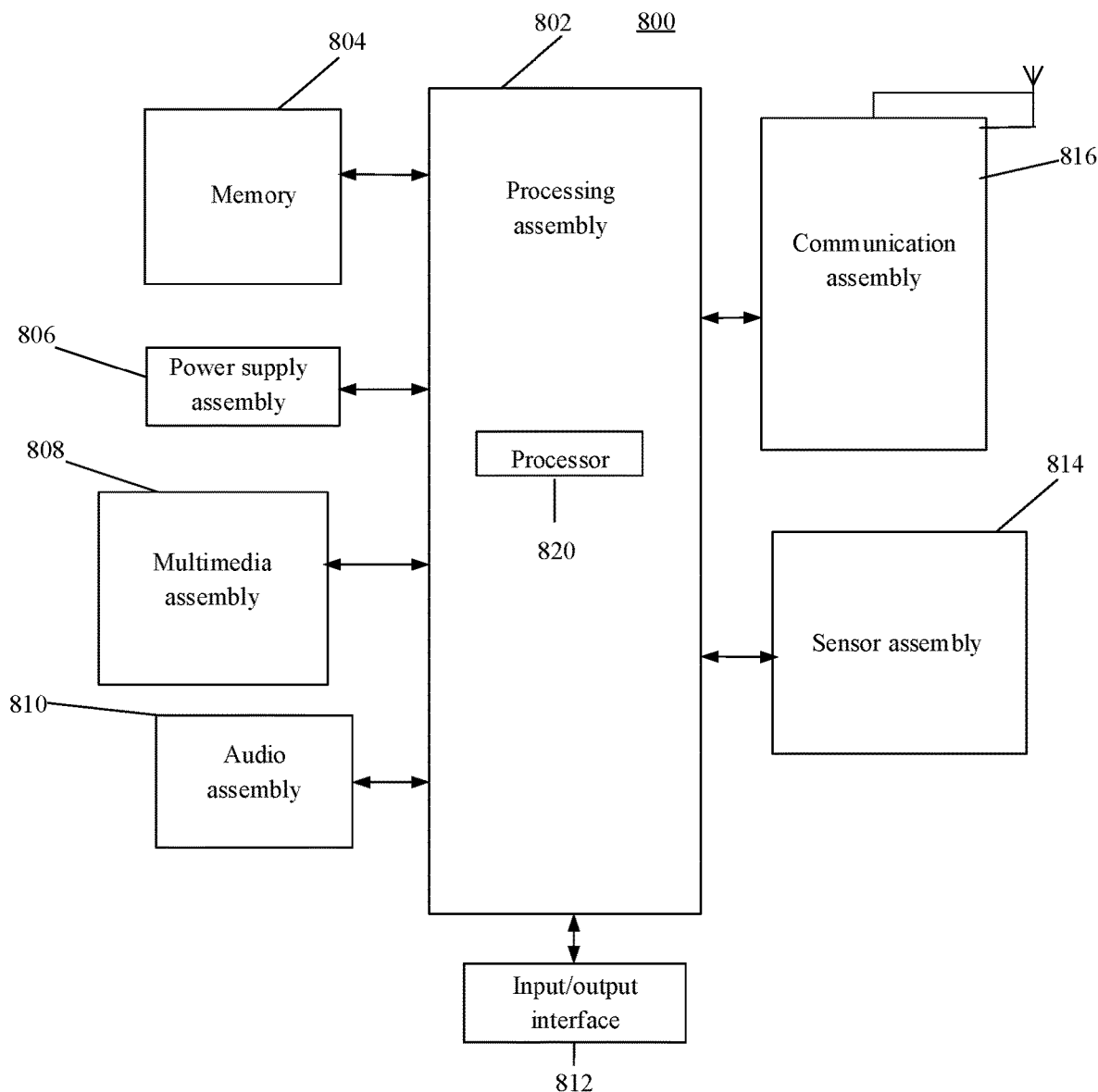
FIG. 7 is a block diagram of an electronic device according to an example.

FIG. 7 is a block diagram of an electronic device 800 according to an example. For example, the electronic device 800 may be a mobile phone, a computer, a digital broadcast terminal, a messaging device, a game console, a tablet device, a medical device, a fitness device, a personal digital assistant, etc.

With reference to FIG. 7, the electronic device 800 may include one or more of the following assemblies: a processing assembly 802, a memory 804, a power supply assembly 806, a multimedia assembly 808, an audio assembly 810, an input/output interface 812, a sensor assembly 814, and a communication assembly 816.

The processing assembly 802 generally controls overall operations of the electronic device 800, such as operations associated with display, telephone call, data communication, camera operations and recording operations. The processing assembly 802 may include one or more processors 820 for executing an instruction, so as to complete all or some steps of the method for controlling display in a floating window. In addition, the processing assembly 802 may include one or more modules to facilitate interaction between the processing assembly 802 and other assemblies. For example, the processing assembly 802 may include a multimedia module to facilitate interaction between the multimedia assembly 808 and the processing assembly 802.

The memory 804 is configured to store various types of data to support the operations on the electronic device 800. Examples of the data include an instruction for any application or method operating on the electronic device 800, contact data, phone book data, a message, a picture, a video, etc. The memory 804 may be implemented by any type of volatile or nonvolatile memory device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power supply assembly 806 supplies power to various assemblies of the electronic device 800. The power supply assembly 806 may include a power management system, one or more power supplies, and other assemblies associated with generating, managing and distributing power for the electronic device 800.

The multimedia assembly 808 includes a screen that provides an output interface between the electronic device 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, slide and gestures on the touch panel. The touch sensor may sense a boundary of a touch or slide operation, and detect duration and pressure related to the touch or slide operation. In some examples, the multimedia assembly 808 includes a front-facing camera and/or a rear-facing camera. When the electronic device 800 is in an operation mode, such as a photographing mode or a video mode, the front-facing camera and/or the rear-facing camera are/is capable of receiving external multimedia data. Each of the front-facing camera and the rear-facing camera may be a fixed optical lens system or have a focal length and optical zoom capability.

The audio assembly 810 is configured to output and/or input an audio signal. For example, the audio assembly 810 includes a microphone (MIC). The MIC is configured to receive an external audio signal when the electronic device 800 is in the operation mode, for example, a calling mode, a recording mode, and a speech identification mode. The received audio signal may be further stored in the memory 804 or transmitted via the communication assembly 816. In some examples, the audio assembly 810 further includes a speaker configured to output an audio signal.

The input/output interface 812 provides an interface between the processing assembly 802 and a peripheral interface module. The peripheral interface module may be a keyboard, a click wheel, a button, etc. The buttons may include, but are not limited to, a home button, a volume button, a start button, and a lock button.

The sensor assembly 814 includes one or more sensors configured to provide state assessments of various aspects for the electronic device 800. For example, the sensor assembly 814 is capable of detecting an on/off state of the electronic device 800 and relative positioning of the assemblies, such as a display and a keypad of the electronic device 800, and the sensor assembly 814 is further capable of detecting position change of the electronic device 800 or an assembly of the electronic device 800, presence or absence of contact between the user and the electronic device 800, an orientation or acceleration/deceleration of the electronic device 800, and temperature change of the electronic device 800. The sensor assembly 814 may include a proximity sensor configured to detect presence of a nearby object without any physical contact. The sensor assembly 814 may further include an optical sensor, such as a complementary metal-oxide-semiconductor (CMOS) or charge-coupled device (CCD) image sensor, which is used in imaging application. In some examples, the sensor assembly 814 may further include an acceleration sensor, a gyroscope sensor, a magnetic sensor, a pressure sensor, or a temperature sensor.

The communication assembly 816 is configured to facilitate wired or radio communication between the electronic device 800 and other devices. The electronic device 800 may access a radio network on the basis of a communication standard, such as WiFi, the 2nd generation mobile communication technology (2G) or the 3rd generation mobile communication technology (3G), or their combination. In an example, the communication assembly 816 receives a broadcast signal or broadcast related information from an external broadcast management system via a broadcast channel. In an example, the communication assembly 816 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology or other technologies.

In an example, the electronic device 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components, thus executing the method for controlling display in a floating window.

In an example, there is further provided a non-transitory computer-readable storage medium including an instruction, such as the memory 804 including an instruction. The instruction may be executed by the processor 820 of the electronic device 800 so as to complete the method for controlling display in a floating window. For example, the non-transitory computer-readable storage medium may be ROM, a random access memory (RAM), CD-ROM, a magnetic tape, a floppy disk, an optical data storage device, etc.

In another example, there is further provided a computer program product, which includes a computer program executable by a programmable apparatus, and the computer program has a code part configured to execute the method for controlling display in a floating window when executed by the programmable apparatus.

Those skilled in the art could easily conceive of other implementation solutions of the disclosure upon consideration of the description and practice of the disclosure. The present disclosure is intended to cover any variations, uses or adaptive changes of the disclosure, which follow the general principles of the disclosure and include common general knowledge or conventional technical means not disclosed in the art. The description and the examples are to be regarded as merely illustrative, and the true scope and spirit of the disclosure are indicated by the following claims.

It is to be understood that the disclosure is not limited to a precise structure described above and illustrated in the accompanying drawings, and can have various modifications and changes without departing from the scope. The scope of the disclosure is limited merely by the appended claims.

What is claimed is:

1. A method for controlling display in a floating window, performed by an electronic device and comprising:
    under a condition that the floating window is enabled, monitoring an information update event of each of a plurality of monitored applications in real time, wherein the monitored applications are applications in a running state and are different from a main application that a user is using in the foreground;
    determining a target monitored application to be displayed this time according to a monitoring result within latest preset time; and
    displaying latest update information of the target monitored application by displaying an information display page of the target monitored application by means of the floating window on a running interface of the main application;
    wherein displaying the information display page of the target monitored application by means of the floating window comprises:
        in response to determining that a plurality of target monitored applications are to be displayed this time and a current window size of the floating window is a default window size, expanding a window size of the floating window, and simultaneously displaying respective information display pages of the plurality of target monitored applications to be displayed this time in the expanded floating window, wherein the default window size is a size suitable for one application;
    wherein determining the target monitored application to be displayed this time according to the monitoring result within latest preset time comprises:
        determining an information activity level of each monitored application according to the monitoring result, wherein the information activity level is configured to represent an information update rate of the monitored application; and determining the target monitored application to be displayed this time according to the information activity level;

wherein determining the target monitored application to be displayed this time according to the information activity level comprises:

under a condition that a plurality of monitored applications are currently displayed in the floating window, in response to determining that the information activity level of each monitored application currently displayed in the floating window is smaller than a preset information activity level threshold and monitored applications not currently displayed in the floating window are present, determining the target monitored application to be displayed this time from the monitored applications not currently displayed in the floating window;

wherein determining the target monitored application to be displayed this time from the monitored applications not currently displayed in the floating window comprises:

determining a monitored application having a maximum information activity level in the monitored applications not currently displayed in the floating window as the target monitored application to be displayed this time, and alternatively, determining, in a preset display order, a monitored application ranking first in display order in the monitored applications not currently displayed in the floating window as the target monitored application to be displayed this time.

2. The method according to claim 1, wherein determining the target monitored application to be displayed this time according to the information activity level further comprises:

under a condition that no monitored application is currently displayed in the floating window, determining a monitored application corresponding to a maximum information activity level as the target monitored application to be displayed this time.

3. The method according to claim 1, wherein determining the target monitored application to be displayed this time according to the information activity level further comprises:

under a condition that a plurality of monitored applications are currently displayed in the floating window, determining a monitored application having an information activity level not smaller than a preset information activity level threshold in the monitored applications currently displayed in the floating window as the target monitored application to be displayed this time; and wherein the method further comprises:

under a condition that the plurality of monitored applications are currently displayed in the floating window, exiting display of a monitored application having an information activity level smaller than the preset information activity level threshold in the monitored applications currently displayed in the floating window.

4. The method according to claim 1, wherein determining the target monitored application to be displayed this time according to the information activity level further comprises:

in response to determining that the information activity level of each monitored application currently displayed in the floating window is smaller than the preset information activity level threshold and no monitored applications not currently displayed in the floating window are present, determining, in a preset display order, a monitored application ranking first in display order in the monitored applications currently displayed in the floating window as the target monitored application to be displayed this time; and the method further comprises:

exiting display of monitored applications not ranking first in the display order in the monitored applications currently displayed in the floating window.

5. The method according to claim 1, wherein determining the target monitored application to be displayed this time according to the information activity level further comprises:

under a condition that one monitored application is currently displayed in the floating window, determining a monitored application corresponding to a maximum information activity level in information activity levels not smaller than a preset information activity level threshold in the monitored applications monitored as the target monitored application to be displayed this time.

6. The method according to claim 1, wherein determining the target monitored application to be displayed this time according to the information activity level further comprises:

under a condition that one monitored application is currently displayed in the floating window, in response to determining that the information activity level of each monitored application monitored is smaller than a preset information activity level threshold, determining, in a preset display order, a successive monitored application ranking behind the monitored application currently displayed in the floating window as the target monitored application to be displayed this time.

7. The method according to claim 1, wherein determining the target monitored application to be displayed this time according to the information activity level further comprises:

under a condition that one monitored application is currently displayed in the floating window, determining a candidate monitored application to be displayed this time according to the information activity level; and under a condition that the candidate monitored application is inconsistent with the monitored application currently displayed in the floating window, in response to determining that both an information activity level of the candidate monitored application and an information activity level of the monitored application currently displayed in the floating window are greater than a preset information activity level threshold and a continuity count of switching display, in the floating window, of the candidate monitored application and the monitored application currently displayed in the floating window reaches a preset count threshold, determining both the monitored application currently displayed in the floating window and the candidate monitored application as target monitored applications to be displayed this time.

8. The method according to claim 1, wherein displaying the information display page of the target monitored application by means of the floating window further comprises:

in response to determining that one target monitored application is to be displayed this time and a current window size of the floating window is an expanded window size, restoring a window size of the floating window to a default window size, and displaying the information display page of the target monitored application in the restored floating window.

9. The method according to claim 1, wherein the method further comprises:
in response to detecting that the user is conducting an input operation on the floating window, determining whether the user completes the input operation on the floating window; and
in response to determining that the user completes the input operation on the floating window, displaying the information display page of the target monitored application by means of the floating window.

10. The method according to claim 1, wherein the plurality of monitored applications monitored comprise at least one of the following:
applications that the user expects to monitor in applications that are in the running state and are different from the main application;
a first preset number of applications used most frequently by the user in applications that are in the running state and are different from the main application;
a second preset number of applications switched to the background for running at switching time closest to current time in applications that are in the running state and are different from the main application; or
a third preset number of applications having a maximum switching frequency between foreground running and background running or applications having a switching frequency between foreground running and background running greater than a preset switching frequency threshold in applications that are in the running state and are different from the main application.

11. An electronic device, comprising:
a processor; and
a memory configured to store an instruction executable by the processor, wherein
the processor is configured to:
monitor, under a condition that a floating window is enabled, an information update event of each of a plurality of monitored applications in real time, wherein the monitored applications are applications in a running state and are different from a main application that a user is using in the foreground;
determine a target monitored application to be displayed this time according to a monitoring result within latest preset time;
display latest update information of the target monitored application by displaying an information display page of the target monitored application by means of the floating window on a running interface of the main application; and
expand, in response to determining that a plurality of target monitored applications are to be displayed this time and a current window size of the floating window is a default window size, a window size of the floating window, and simultaneously display respective information display pages of the plurality of target monitored applications to be displayed this time in the expanded floating window, wherein the default window size is a size suitable for one application;
wherein determine the target monitored application to be displayed this time according to the monitoring result within latest preset time comprises:
determine an information activity level of each monitored application according to the monitoring result, wherein the information activity level is configured to represent an information update rate of the monitored application; and
determine the target monitored application to be displayed this time according to the information activity level;
wherein determine the target monitored application to be displayed this time according to the information activity level comprises:
under a condition that a plurality of monitored applications are currently displayed in the floating window, in response to determining that the information activity level of each monitored application currently displayed in the floating window is smaller than a preset information activity level threshold and monitored applications not currently displayed in the floating window are present, determine the target monitored application to be displayed this time from the monitored applications not currently displayed in the floating window;
wherein determine the target monitored application to be displayed this time from the monitored applications not currently displayed in the floating window comprises:
determine a monitored application having a maximum information activity level in the monitored applications not currently displayed in the floating window as the target monitored application to be displayed this time, and alternatively,
determine, in a preset display order, a monitored application ranking first in display order in the monitored applications not currently displayed in the floating window as the target monitored application to be displayed this time.

12. The electronic device according to claim 11, wherein the plurality of monitored applications monitored comprise at least one of the following:
applications that the user expects to monitor in applications that are in the running state and are different from the main application;
a first preset number of applications used most frequently by the user in applications that are in the running state and are different from the main application;
a second preset number of applications switched to the background for running at switching time closest to current time in applications that are in the running state and are different from the main application; or
a third preset number of applications having a maximum switching frequency between foreground running and background running or applications having a switching frequency between foreground running and background running greater than a preset switching frequency threshold in applications that are in the running state and are different from the main application.

13. A non-transitory computer-readable storage medium, storing a computer program instruction, wherein when executed by a processor, the computer program instruction implements:
monitoring, under a condition that a floating window is enabled, an information update event of each of a plurality of monitored applications in real time, wherein the monitored applications are applications in a running state and are different from a main application that a user is using in the foreground;

determining a target monitored application to be displayed this time according to a monitoring result within latest preset time;

displaying latest update information of the target monitored application by displaying an information display page of the target monitored application by means of the floating window on a running interface of the main application; and in response to determining that a plurality of target monitored applications are to be displayed this time and a current window size of the floating window is a default window size, expanding a window size of the floating window, and simultaneously displaying respective information display pages of the plurality of target monitored applications to be displayed this time in the expanded floating window, wherein the default window size is a size suitable for one application;

wherein determining the target monitored application to be displayed this time according to the monitoring result within latest preset time comprises:
  determining an information activity level of each monitored application according to the monitoring result, wherein the information activity level is configured to represent an information update rate of the monitored application; and
  determining the target monitored application to be displayed this time according to the information activity level;

wherein determining the target monitored application to be displayed this time according to the information activity level comprises:
  under a condition that a plurality of monitored applications are currently displayed in the floating window, in response to determining that the information activity level of each monitored application currently displayed in the floating window is smaller than a preset information activity level threshold and monitored applications not currently displayed in the floating window are present, determining the target monitored application to be displayed this time from the monitored applications not currently displayed in the floating window;

wherein determining the target monitored application to be displayed this time from the monitored applications not currently displayed in the floating window comprises:
  determining a monitored application having a maximum information activity level in the monitored applications not currently displayed in the floating window as the target monitored application to be displayed this time, and alternatively,
  determining, in a preset display order, a monitored application ranking first in display order in the monitored applications not currently displayed in the floating window as the target monitored application to be displayed this time.

\* \* \* \* \*